(12) United States Patent
Shpizel et al.

(10) Patent No.: US 7,019,877 B2
(45) Date of Patent: Mar. 28, 2006

(54) LIGHT BEAM DEFLECTOR

(76) Inventors: Matvey B. Shpizel, 1835 83rd St., Apt. 3A, Brooklyn, NY (US) 11214; Boris I. Spektor, Nativ Hen 33, apt. 29, Neve, Shaanan, Haifa (IL)

(*) Notice: Subject to any disclaimer, the term of this patent is extended or adjusted under 35 U.S.C. 154(b) by 13 days.

(21) Appl. No.: 10/396,738

(22) Filed: Mar. 25, 2003

(65) Prior Publication Data

US 2004/0190097 A1    Sep. 30, 2004

(51) Int. Cl.
*G02B 26/08*    (2006.01)

(52) U.S. Cl. ............... 359/198; 359/199; 359/213; 359/220

(58) Field of Classification Search ............ 310/36, 310/40 R, 90.5; 359/198–200, 272–275, 359/220–221, 223, 224, 226
See application file for complete search history.

(56) References Cited

U.S. PATENT DOCUMENTS

| | | | |
|---|---|---|---|
| 4,828,347 A | 5/1989 | Keiser | |
| 4,841,135 A | 6/1989 | Goto et al. | |
| 5,371,347 A | 12/1994 | Plesko | 235/467 |
| 5,754,327 A | 5/1998 | Masotti et al. | 359/198 |
| 6,188,502 B1 | 2/2001 | Aoki | 359/198 |
| 6,229,637 B1 | 5/2001 | Suzuki et al. | 359/198 |
| 6,292,310 B1 | 9/2001 | Chao | 359/813 |
| 2003/0053186 A1* | 3/2003 | Arima | |

* cited by examiner

*Primary Examiner*—James Phan
(74) *Attorney, Agent, or Firm*—Marsh Fischmann & Breyfeyle, LLP

(57) ABSTRACT

The present invention relates to a device for use in deflecting a concentrated light beam in two coordinates, for example, of a polar coordinate system. In this regard, the device utilizes a mirror that may be controllably tilted or oscillated about an axis of oscillation and that may also be rotated to any angular position (0 to $2\pi$) about an axis of rotation. In this regard, the mirror may be tilted in any one of a number of planes passing through the intersection point of the axis of oscillation and axis of rotation. Furthermore, the mirror may be oscillated between first and second angular positions or tilted to a fixed angle relative the axis of oscillation, in conjunction with controlled movement around the axis of rotation. In this regard, a device is provided wherein the mirror has multiple degrees of freedom allowing for a plurality of beam deflection applications.

36 Claims, 3 Drawing Sheets

LIGHT BEAM DEFLECTOR

FIELD OF THE INVENTION

The present invention relates to a device for deflecting a light beam in a controllable manner. In particular, the present invention relates to a device for use in deflecting a concentrated light beam in two coordinates, for example, of a polar coordinate system.

BACKGROUND

In many applications, it is desirable to controllably deflect concentrated beams of electromagnetic energy (i.e., concentrated light beams) that originate from a fixed or moving light beam source. A short list of such applications includes scanning pictures onto video monitors, scanning information from bar codes, performing medical procedures, creating projected visual displays, e.g., for light shows, as well as for use in creating optical connections. Depending upon the specific application, it may be desirable to deflect concentrated light beams of multiple wavelength (polychromatic) visible light, monochromatic light (i.e., lasers) as well as non-visible light (e.g., ultraviolet or infrared light). In any case, a light beam deflector, which may include one or more selectively controllable mirrors, is typically utilized to redirect a concentrated light beam to a desired position in space or in a desired pattern.

In single mirror light beam deflectors, a mirror is generally interconnected to one or more mechanical control devices for adjusting the orientation of the mirror relative to the light beam source. For example, in some applications a mirror is affixed to an output shaft of a motor that is capable of oscillating the mirror relative to a fixed plane in order to allow for the line by line scanning of pictures, e.g., in a raster pattern. In other applications, mirrors may be capable of tilting about two perpendicular axes to allow the mirror to be oriented in any of a number of planes extending through the intersection of the axes. Accordingly, a light beam may be deflected to substantially any point in space as limited by the range of movement of the mirror about the axes.

Each of the above deflectors (i.e., oscillating and two axes tilting), while being well suited for some applications, are often of limited value in applications requiring multiple degrees of mirror freedom for directing a light beam in complex patterns. For example, oscillating deflectors while being well suited for line by line scanning application often have a limited operating range as well as a mirror fixed in a single plane. Furthermore, two axes tilting mirror deflectors tend to be mechanically intricate and often require complex control signals in order to adjust the deflector's mirror to a desired orientation. In this regard, these deflectors are of limited value in scanning and graphic applications where it is desirable to rapidly scan a beam across a surface in a controlled manner. That is, periodic, harmonic or other complex light deflection patterns may require unduly complex control signals that require expanded processing and control systems and/or require feedback to properly direct a deflected light beam to a point in space. Furthermore, deflection about two axes often results in translating the mirror relative to a fixed reference point. That is, the tilting of the mirror about two axis often shifts the position of the mirror relative to a fixed light beam source. Accordingly, this relative movement between the mirror and the light source may change the distance and/or angle between the light source and mirror introducing additional complexities in generation of control signals for use in directing a light beam in a desired manner.

SUMMARY OF THE INVENTION

The present invention provides a simplified light beam deflector that utilizes a single mirror to controllably deflect a concentrated light beam to a desired point in space without requiring feedback or complex control signals. In this regard, the deflector utilizes a mirror that may be controllably tilted or oscillated about an axis of oscillation and that may also be rotated to any angular position (0 to $2\pi$) about an axis of rotation. In this regard, the mirror may be tilted in any one of a number of planes passing through the intersection point of the axis of oscillation and axis of rotation. Furthermore, the mirror may be oscillated between first and second angular positions or tilted to a fixed angle relative the axis of oscillation, in conjunction with controlled movement around the axis of rotation. In this regard, a deflector is provided wherein the deflector's mirror has multiple degrees of freedom allowing for a plurality of beam deflection applications.

According to a first aspect of the present invention, the light beam deflector is provided that includes a mirror mounted to a frame for controlled tilting about an axis of oscillation. That is, the mirror is mounted to the frame such that the mirror can pivot or otherwise tilt relative to the axis of oscillation. This tilting is controlled by a permanent magnet interconnected to the mirror, which is disposed relative to a portion of an electromagnet that is affixed to the frame. By selectively applying magnetic fields to the electromagnet (e.g., positive and negative polarities of varying magnitudes), the permanent magnet may be deflected, thereby causing the mirror to tilt relative to the axis of oscillation. Finally, the frame itself is rotatable about an axis of rotation that is substantially perpendicular to the axis of oscillation such that the mirror may be tilted in any plane within its operating aperture (e.g. positive and negative tilt angles relative to the axis of oscillation) or oscillated between angular positions while the axis of oscillation is controllably rotated about the axis of rotation. As will be appreciated, the permanent magnet and electromagnet may remain in a fixed relationship during rotation thereby allowing control of the tilting/oscillating of the mirror in conjunction with rotating the mirror. In one embodiment, the axis of oscillation is substantially aligned with a surface of the mirror. In this regard, the position of at least a portion of the mirror may remain fixed relative to a light source. As will be appreciated, this reduces the complexity of any control signals required to direct a beam as well as reduces or eliminates the need of a feedback system for directing the beam to a desired point in space.

The permanent magnet may be interconnected to the mirror in any appropriate manner so long as a deflection of the permanent magnet is operative to tilt the mirror about the axis of oscillation. In one embodiment, the permanent magnet is interconnected to the mirror in a pendulum-like arrangement. In this regard, the reflective surface of the mirror (e.g., top side) may be above or aligned with the axis of oscillation while the permanent magnet may be disposed below the axis of oscillation. In this embodiment, the permanent magnet may use gravity and/or magnetic forces to center the mirror in a neutral position when no magnetic fields are applied thereto. For example, the permanent magnet may be interconnected to the mirror utilizing a rod such that the permanent magnet is also pivotably interconnected to the frame about the axis of oscillation. In this regard, depending on the orientation of the permanent magnet relative to the axis of oscillation, a displacement of the permanent magnet may result in a magnified or reduced movement (e.g., tilt) of the mirror relative to the axis of oscillation. That is, the lever arm interconnecting the permanent magnet relative to the axis of oscillation may be sized to assist in controllably tilting the mirror about the axis of oscillation.

The electromagnet may be of any appropriate configuration that allows for the controllable creation of a magnetic field for displacing the permanent magnet and tilting the mirror. As will be appreciated, the electromagnet, will generally comprise a ferromagnetic core (i.e. "core") and windings. In one embodiment the core is aligned with the axis of rotation, about which the frame rotates. For example, a cylindrical core may be disposed through the frame along the axis of rotation. The windings, which may comprise a coil, may be disposed around a side surface of the core so that, when energized, the core is turned into a magnet, similar to a bar magnet having a first pole on a first end of the cylinder and a second pole on a second end of the cylinder. In one embodiment, the core of the electromagnet is fixedly interconnected to the frame on a first end and interconnected to a DC motor on a second end. This allows the frame and mirror to be controllably rotated about an axis perpendicular to the axis of oscillation. In this embodiment the frame is preferably formed from non-magnetic material, such as aluminum, duraluminum, bronze, etc., to prevent the creation of unwanted magnetic fields.

As will be appreciated, by reversing the current or voltage within the windings of the electromagnet, the polarity/poles of the core may be reversed. In this regard, a magnetic field applied to the permanent magnet by one end of the electromagnet may be controlled by, for example, reversing the voltage within the windings of the electromagnet. In this regard, the permanent magnet may be initially deflected in a first direction and then deflected in a second opposite direction, thereby tilting the mirror in first and second directions relative to the axis of oscillation. To control the magnetic field, e.g., such as switching the polarity of the core, for the purposes of manipulating the permanent magnet and the mirror, the windings of the electromagnet may be supplied with a controlled voltage waveform. For example, a sinusoidal waveform that alternates between positive and negative voltages may be applied to the winding. Accordingly, the magnetic field of the electromagnet may go from zero, wherein the permanent magnet may be attracted directly to the core thereby holding the mirror in a neutral position, to a positive voltage wherein an end of the core has a first polarity that pushes the permanent magnet in the first direction, back to zero, then to a second polarity wherein the electromagnet pushes the permanent magnet in an opposite direction. As will be appreciated, by providing a continuous alternating waveform (e.g. sinusoidal), the permanent magnet and therefore the mirror may be controllably oscillated back and forth. Accordingly, any alternating waveform may be utilized, e.g., harmonic waveforms, sawtooth waveforms, stairstep waveforms, etc.

Furthermore, varying voltages may be provided to alter the orientation of the mirror from a first position to a second position without necessarily tilting the mirror about a neutral midpoint of the axis of oscillation. In this regard, it will be appreciated that by varying the voltage within the windings, the strength of a magnetic field generated by the electromagnet may be increased or decreased, thereby increasing or decreasing the deflection of the permanent magnet and corresponding tilt angle of the mirror relative to the axis of oscillation. Furthermore, constant voltages may be applied to the windings such that a constant displacement of the mirror is generated about the axis of oscillation.

As noted, by supplying controllable waveform to the windings of the electromagnet, the mirror can oscillate between first and second positions relative to the axis of oscillation. Furthermore, by controlling the magnitude of the voltage in the windings of the electromagnet, the tilt angle of the mirror may also be controlled during oscillation. Preferably, the mirror will be able to tilt between about a negative 60° angle and about a positive 60° angle relative to the angle of oscillation. In this regard, a light beam may be deflected by the deflector device over an aperture of 120°. As noted, by rotating the axis of oscillation and tilting the mirror to a desired angle within the allowable aperture angles, the mirror of the deflector may be oriented in any of an infinite number of planes. Alternatively, the mirror may be oscillated between two points along any line extending through the axis of rotation. Furthermore, when utilized with a DC motor, the mirror may be tilted to a desired angle and rotated or, oscillated. As will be appreciated, when utilized with an alternating current with a DC motor, the motor can be made to move forward and backwards at a controlled rate, thereby allowing oscillation about the axis of rotation as well. This allows for concurrent oscillation about two axes if so desired. Furthermore, a waveform generator, processor, or other control device may be utilized to supply the windings of the electromagnet and DC motor with cooperative control waveforms to generate a desired deflection pattern for a concentrated light source. For example, through cooperative control of the DC motor and coil, a concentrated light source (e.g., a laser) may be deflected in a complex pattern, e.g., figure eight pattern, star pattern, etc. without requiring complex control signals to continually adjust the tilt angle of the mirror. Alternatively, the mirror may be set to a fixed angle to oscillate at a fixed rate while being rotated at a constant or variable rate around the axis of rotation. As will be appreciated, this may be utilized for applications such as bar code readers.

According to a second aspect of the present invention, a light beam deflector is provided that maintains a fixed distance between at least a portion of a reflective surface of a mirror and a light source even when the mirror is tilted and/or rotated. In this regard, the light beam deflector includes a frame having a mirror mounted thereto about a first axis. In order to maintain a constant distance between at least a portion of the mirror and the light source, the first axis is substantially aligned with the reflective surface of the mirror. As will be appreciated, if a light beam from a light source is directed towards the mirror along this first axis the distance between the mirror and light source will remain constant , even if the mirror is tilted. The deflector utilizes an actuator for controllably tilting the mirror relative to this axis and a drive mechanism for controllably rotating the frame about a rotational axis transverse to the first axis. Preferably, this rotational axis is substantially perpendicular to the first axis and intersects the first axis at a position on the surface of the mirror. Accordingly if these axes intersect on the mirror, a light beam from a light source may be directed at this point and the mirror may be tilted and/or rotated without changing the distance between the mirror and the light source.

The mirror of the second aspect may be connected to the frame in any manner that allows the mirror to tilt relative to the first axis. Preferably, the mirror will be operative to tilt between about −60° and +60° relative to the first axis to allow the deflector to deflect light over an operating aperture of about 120°. That is, the actuator, which may comprise any appropriate mechanical linkage, electromechanical device or drive system may tilt the mirror to any position within the operating aperture. Additionally, the actuator may also oscillate the mirror between any two angular positions within the operating aperture.

To allow the mirror to be tilted and/or oscillated in two coordinates, the drive mechanism, which may comprise a motor, gearing system, pulley system, or any other appropriate means for rotating the frame, is operative to position the mirror in any angular position 0–360° about the rotational axis. Additionally, the frame and mirror may be continuous rotated, or, oscillated about the rotational axis.

According to a third aspect of the present invention, a method for controllably deflecting a light beam is provided. The method allows for simplified deflection of the light beam by utilizing a light deflector that maintains a constant distance between the light source and a mirror, thereby eliminating one or more variables required to generate a control signal for positioning and/or moving a mirror to controllably deflect a light beam. In this regard, the mirror may be tilted to an initial tilt angle about a first axis that is substantially aligned with the reflective surface on that mirror. Furthermore, the mirror may be rotated to an initial angular orientation about a second axis that is transverse and typically perpendicular to the first axis such that the mirror has a desired initial orientation. That is, the mirror may initially be tilted to deflect a light beam from a light source to a first known position. Once the mirror is set to its initial position, the mirror may be moved about one or both the first and second axes to controllably deflect the light beam from the first position to the second position.

DETAILED DESCRIPTION

The present invention is directed to a light beam deflector utilized to controllably deflect a concentrated light beam (e.g., laser and/or multi-wavelength concentrated light beams). The deflector is applicable for a variety of light beam deflection applications including, without limitation, compact beam scanning applications (e.g., for reading bar codes), controlled movement of medical laser devices, light projection applications such as light shows, as well as for use in creating optical connections. In this regard, the deflector utilizes a mirror that may be controllably tilted about an axis of oscillation that may be oriented in any angular position (0 to $2\pi$) about an axis of rotation perpendicular to the axis of oscillation. Accordingly, this allows the mirror to tilt in any one of an infinite number of planes passing through the point of intersection of the axes. Furthermore, the mirror may be oscillated between first and second tilt angles in any plane coinciding with the axis of rotation. The mirror may also be tilted about the axis of oscillation while being rotated or oscillated about the axis of rotation. In this regard, a deflector is provided in which a mirror that can rotate and oscillate in different planes, thereby providing the one mirror, two-coordinate polar deflector.

Figure 1:
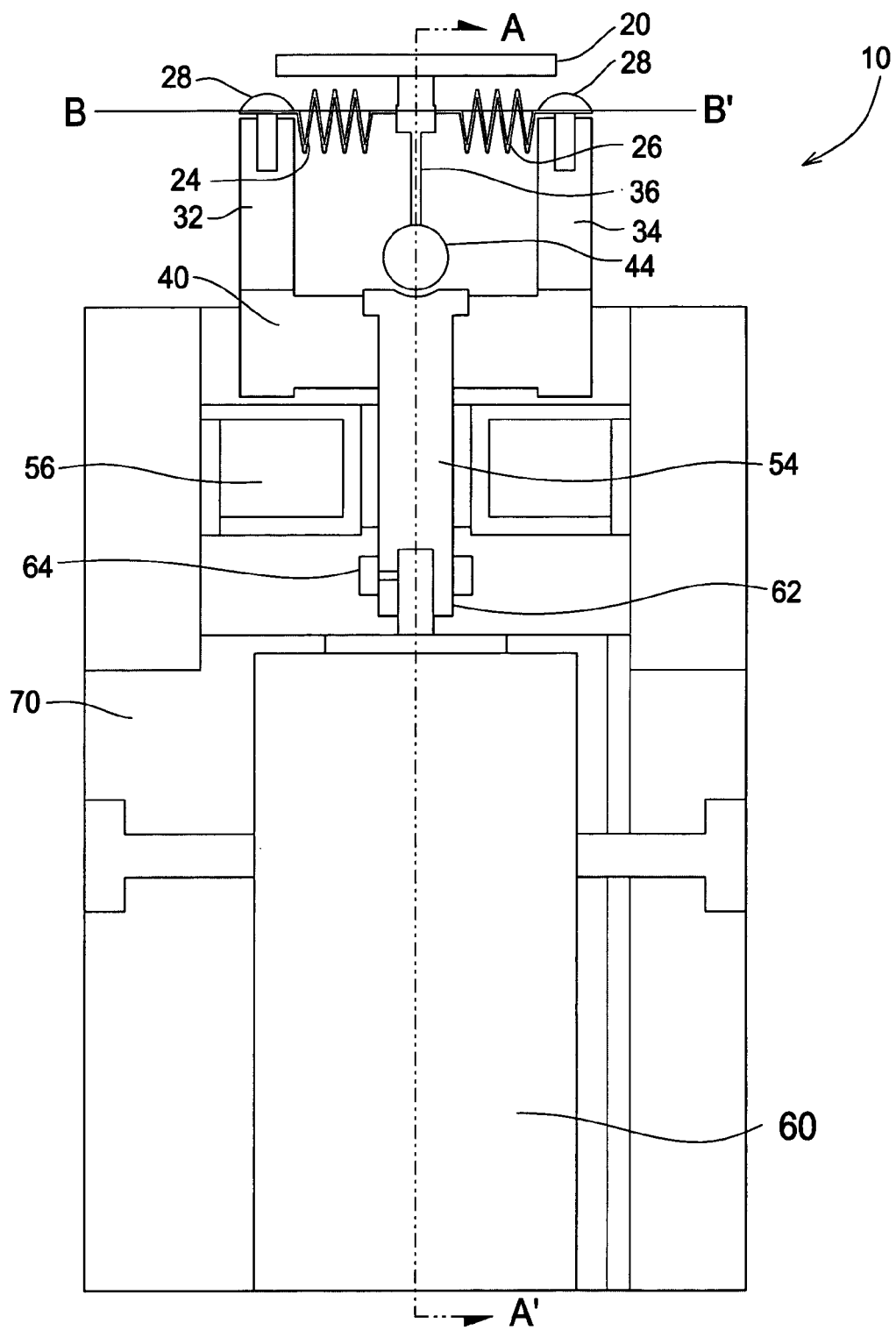
FIG. 1 shows a first embodiment of a polar coordinate light deflector.

FIG. 1 shows a first embodiment of the deflector 10. As shown, the deflector 10 generally comprises a mirror 20 that is pivotally mounted about an axis of oscillation B–B' to a selectively rotatable frame 40 using first and second resilient spring members 24, 26. In particular, the spring members 24, 26 are interconnected by screws 28 to first and second posts 32, 34 that are fixedly interconnected to the frame 40. The spring members 24, 26 are utilized to fastening a mirror 20 in symmetric position relative to axes A–A' and B–B'. The posts 32, 34 as well as the frame 40 are made of a nonmagnetic material so as not to interfere with the controllable displacement of the mirror 20 using magnetic forces, as will be discussed herein. In one embodiment, the frame 40 and posts 32, 34 are formed from a duralumin compound. It will be appreciated that the frame 40 is substantially circular and that the first and second posts 32, 34 are disposed on opposite portions of the frame 40 along a common axis, thereby allowing the frame 40 and posts 32, 34 and hence the mirror 20 to remain balanced during rotation.

Disposed through the center of the frame 40, which defines an axis of rotation A–A', is a core 54 (e.g., ferromagnetic rod) of a selectively controllable electromagnet circuit. This core 54 is fixedly interconnected to the frame 40 such that when the core 54 turns the frame 40 also turns. An opposite end of the core 54 is interconnected to an output shaft 62 of a DC motor 60 by a fixing screw 64. In this regard, the DC motor 60 may be utilized to controllably rotate the frame 40 and the interconnected mirror 20 about the axis of rotation A–A', as will be discussed herein.

The electromagnetic circuit further includes a coil 56 disposed about the core 54. The coil 56, which may be controllably energized, is mounted to a casing 70 of the deflector 10 and does not rotate. Accordingly, once the coil 56 is energized, the core 54 becomes magnetized regardless of whether the core 54 is rotating. In this regard, when a voltage is present within the coil 56, the core 54 becomes magnetized in a manner similar to that of a bar magnet wherein the ends of the core 54 correspond to magnetic poles. In this regard, by controlling the voltage in the core 56, a magnetic pole may be generated at the working end 58 of the core 54 that is disposed through the frame 40 and proximate to a permanent magnet 44, which is utilized to tilt the mirror 20 about an axis of oscillation B–B', as will be discussed herein. Furthermore, it will be appreciated that by controlling the voltage in the coil 56 that the magnetic polarity generated at the working end 58 of the electromagnet core 54 may be manipulated, e.g., reversed.

The permanent magnet 44 is interconnected to the mirror 20 and is operable to tilt the mirror 20 relative to the axis of oscillation B–B'. As shown in FIG. 1, the permanent magnet is interconnected to the mirror 20 using a non-magnetic bronze rod 36, though other non-magnetic materials may be utilized to form this interconnection. As shown, the permanent magnet 44 is in a pendulum-like relationship with the mirror 20. Accordingly, when the permanent magnet 44 is displaced from a neutral position directly above the working end 58 of the core 54, the mirror 20 will be tilted relative to the axis of oscillation B–B'. As shown, the mirror 20 is disposed in a plane perpendicular to the axis of rotation A–A' when in this neutral position.

Figure 2:
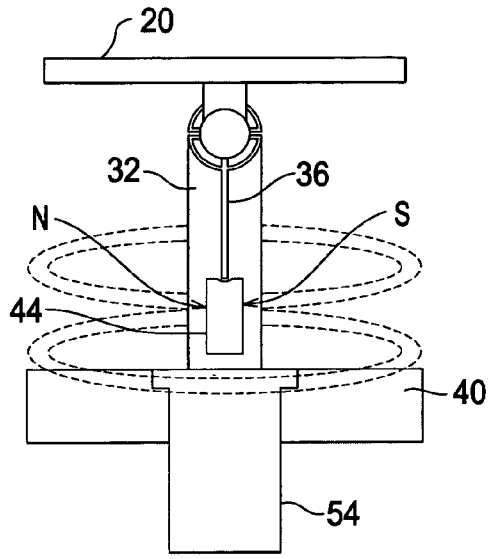
FIG. 2 shows a first partial cross-sectional view of the light deflector of FIG. 1 taken along line A–A'.
Figure 4:
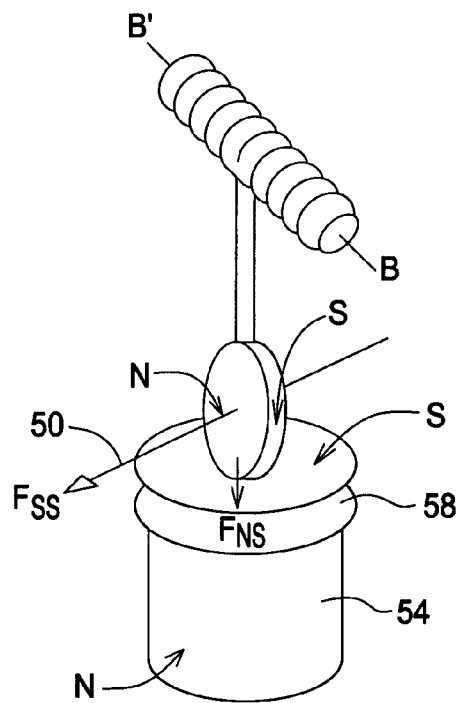
FIG. 4 shows a perspective view of a magnetic positioning portion of the light deflector of FIG. 1.

Referring to FIGS. 1, 2, and 4, utilization of the permanent magnet 44 to oscillate the mirror 20 about the axis of oscillation B–B' is more fully described. As will be appreciated, the permanent magnet 44 is a bipolar magnet having a north pole 46 and a south pole 48, as well as a magnetic axis 50 (i.e., a line joining the poles 46, 48). As shown in FIG. 2, at the neutral position the magnet 44 is suspended slightly above the working end 58 of the core 54 of the electromagnetic circuit. When the core 54 is not magnetized, the permanent magnet 44 is magnetically attracted to the core 54 (which is a ferromagnetic material) and holds the mirror 20 in a fixed plane (i.e. perpendicular) about the axis of oscillation B–B'.

Figure 3:
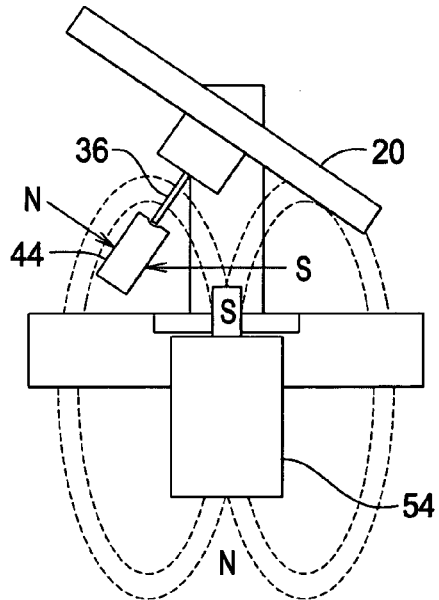
FIG. 3 shows a second cross-sectional view taken along line A–A'.
Figure 5A:
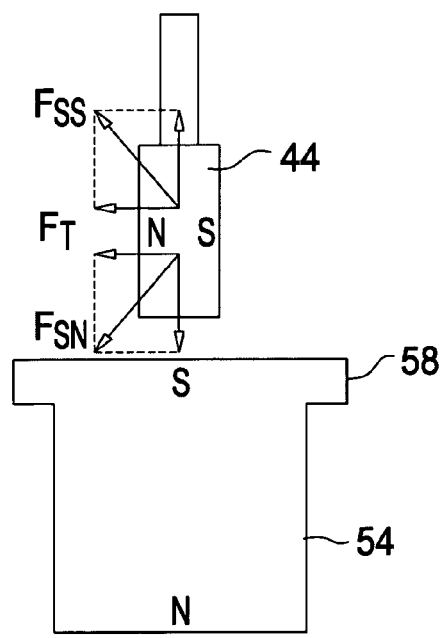
FIGS. 5a and 5b show magnetic forces acting on the light deflector.
Figure 5B:
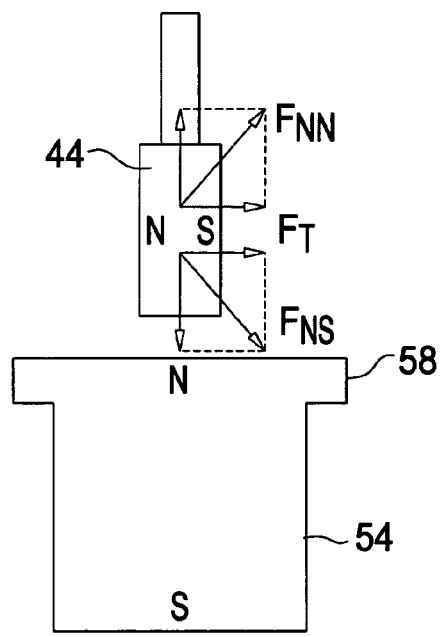

When the coil 56 is energized, and a magnetic polarity (e.g., a south pole, see FIG. 3) is created on the working end 58 of the core 54. Accordingly, the magnetic field of the core 54 and the permanent magnet 44 will interact. Of course, like poles repel each other and unlike poles attract each other. However, as shown in FIG. 4, it will be noted that the poles 46, 48 of the permanent magnet 44 are initially disposed such that the magnetic axis 50 interconnecting those poles 46, 48 is perpendicular to the working end 58 of the core 54. In this regard, an attractive or repulsive component of each pole of the permanent magnet 44 interacts with the working end of the core 54 (see FIG. 4). When no voltage is present in the coil 56, the resulting combined force ($F_{NS}$) of the permanent magnet 44 is attracted to the working end 58 of the core 54. However, when voltage is present in the coil 56 and a magnetic pole exists at the working end 58 of the core 54 (e.g. a south pole as shown in FIGS. 3 and 5A) the attractive ($F_{ns}$ or $F_{sn}$) and repulsive ($F_{ss}$ or $F_{sn}$) forces will exist between the poles 46, 48 of the permanent magnet 44 and the electromagnetic core 54. In particular, the south pole 48 of the permanent magnet 44 will generate a repulsive force ($F_{ss}$) relative to the south pole on the working end 58 of the electromagnetic core while the north pole 46 of the permanent magnet 44 will provide an attractive force ($F_{sn}$) relative to the working end 58 of the electromagnetic core 54. The resulting force $F_t$ directs the permanent magnet 44 to the left as shown in FIG. 5A. FIG. 3 shows the resulting displacement of the permanent magnet 44 relative to the working end 58 of the electromagnetic core 54. Accordingly, this displacement of the permanent magnet 44 rotates the mirror 20 about the axis of oscillation B–B'. As will be appreciated, by reversing the polarity the working end 58 of the electromagnetic core 54 (see FIG. 5B) displacement force $F_t$ may act in the opposite direction wherein the permanent magnet 44 and mirror 20 will be displaced in opposing positions relative to the axis of oscillation B–B'.

Figure 6:
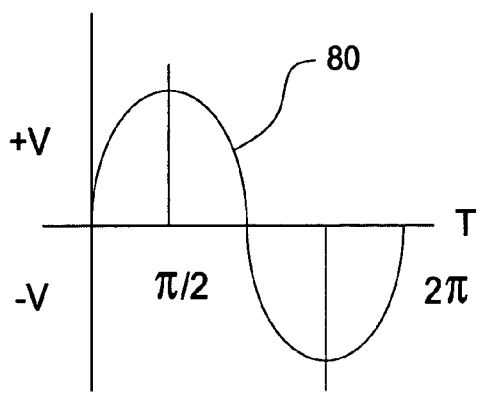
FIGS. 6 and 7 show waveform inputs.

In order to create a controlled oscillation without the axis of oscillation B–B', the coil 56 may be provided with a desired waveform. For example, as shown in FIG. 6, the coil is provided with an alternating sinusoidal voltage waveform 80. As will be appreciated, when the waveform 80 has a zero voltage, the working end 58 of the electromagnetic core 58 is neutral and the permanent magnet 44 will be magnetically attracted thereto such that the permanent magnet 44 and mirror 20 are in the neutral position. During the first quarter of the period ($0-\pi/2$), the voltage within the coil increases, and a south polarity is generated on the working end 58 of the core 54, thereby displacing the permanent magnet 44 from the neutral position to the position shown in FIG. 3. Likewise, during the second quarter of the period ($\pi/2 - \pi$) the permanent magnet 44 and mirror 20 return to the neutral position and in the third quarter of the period ($\pi - 3\pi/2$) rotate to a position opposite of that shown in FIG. 3. Finally, in the fourth quarter of the period ($3\pi/2 - 2\pi$) the permanent magnet 44 and mirror 20 return to the neutral position. In this regard, the alternative sinusoidal voltage waveform 80 generates a controlled oscillation of the mirror 20 about the axis of oscillation B–B'.

Figure 7:
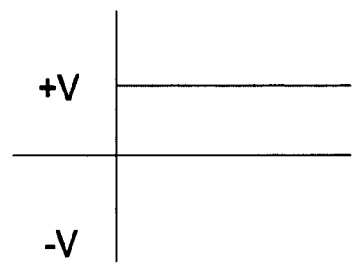

The magnitude of the voltage of the waveform 80 dictates the displacement of the permanent magnet 44 and therefore, the tilt of the mirror 20 about the axis of oscillation B–B'. That is, greater voltage will result in a larger magnetic field about the working end 58 of the core 54 and therefore a greater displacement of the permanent magnet 44 and a greater tilt angle of the mirror 20. Likewise, smaller voltage magnitudes will result in smaller displacements. Furthermore, it will be appreciated that other waveforms may be utilized to produce movement of the mirror 20. For example, an alternating saw tooth waveform may be utilized or, as shown in FIG. 7, a constant voltage may be applied to the coil to generate a constant magnetic field on the working end 58 of the electromagnetic core 54. In this regard, a constant tilt angle in the mirror 20 may be produced about the axis of oscillation B–B'.

As shown in FIGS. 1 and 4, the permanent magnet 44 is in a first dimension generally circular. Likewise, the working end 58 of the electromagnetic core 54 is also generally circular. In order to produce oscillations of up to about 120° it has been found that the permanent magnet 44 should have a diameter of equal to about 0.7 of the diameter of the working end 58 of the electromagnetic core 54. This is true in compact applications (e.g., mirrors up to 10 mm in diameter) as well as large beam deflection applications (e.g. mirrors up to 150 mm in diameter). In this regard, it should be noted that the deflector 10 may be utilized with small light beams (e.g., 1 mm) or with large light beams (e.g., 120 mm). However, other ratios may be utilized to produce other deflection apertures and are considered within the scope of the present invention.

If a continuous alternating voltage waveform is provided to the coil 56, the mirror 20 will continually oscillate about the axis of oscillation B–B'. Alternatively, the mirror 20 may be tilted at a constant angle relative to the axis of oscillation B–B'. In the embodiment shown, the mirror 20 may be tilted from about a positive 60° angle to about a negative 60° angle as seen along the axis of oscillation B–B'. Furthermore, by rotating the frame 40 about the axis of rotation A–A' it is possible to move the mirror 20 into any one of an infinite number of planes passing through the intersection point of the axis of oscillation B–B' and axis of rotation A–A'. Furthermore, the mirror 20 will be oscillated between first and second points in any of an infinite number of planes coinciding with the axis of rotation A–A'.

The deflector 10 may also be utilized to rotate and oscillate the mirror 20 at the same time. In this regard, the deflector 10 may be utilized to create, for example, patterns of a deflected light source. In this regard, a sinusoidal waveform 80 may be applied to the electromagnetic coil 56 while the DC motor 60 rotates the frame at a constant speed. Furthermore, as the motor 60 is a DC motor, an alternating current may also be applied to that motor, thereby providing a harmonic oscillation synchronized with the frequency of the alternating current. As will be appreciated, the alternating waveform and coil 56 and an alternating current within the DC motor 60 may be synchronized to provide controllable oscillation about the axis of rotation A–A' in conjunction with controlled oscillation about the axis of oscillation B–B'. In this regard, processors and/or waveform generators may be incorporated into the deflector 10 to generate the cooperative waveforms.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A light beam deflector, comprising:
   a frame mounted for selective movement about a rotational axis;
   a mirror mounted to said frame, said mirror being operable to tilt relative to said frame about a first axis, wherein said first axis is disposed substantially within a plane defined by a reflective surface of said mirror, and wherein said rotational axis is transverse to said plane;
   a tilt drive mechanism for controllably tilting said mirror relative to said first axis.

2. The device of claim 1, wherein said first axis and said rotational axis are perpendicular and intersect.

3. The device of claim 1, wherein said tilt drive mechanism further compnses:
   a permanent magnet interconnected to said mirror; and
   an electromagnet interconnected to said frame and disposed proximate to said permanent magnet for selectively generating a magnetic field to selectively attract and repel said permanent magnet.

4. The device of claim 3, wherein said permanent magnet is attached to said mirror such that selectively generating said magnetic field controllably displaces said permanent magnet causing said mirror to tilt about said first axis.

5. The device of claim 4, wherein said mirror is operable to tilt between about –60° and about 60° relative to said first axis.

6. The device of claim 4, wherein said mirror is operable to tilt about said first axis in conjunction with said selective movement said frame about said rotational axis.

7. The device of claim 3, wherein said electromagnet further comprises;
   a ferromagnetic core having first and second ends aligned with said rotational axis.

8. The device of claim 7, wherein first and second ends of said core form first and second magnetic poles when said electromagnet generates said magnetic field.

9. The device of claim 8, wherein said electromagnet further comprises:
   a coil for receiving controllable voltages for controlling a magnitude and polarity of said magnetic field.

10. The device of claim 9, wherein said coil is operative to receive alternating voltages, wherein said poles alternate with said voltage.

11. The device of claim 7, wherein said permanent magnet is disposed above one end of said core when said electromagnet is inactive.

12. The device of claim 11, wherein said permanent magnet has a magnetic axis aligned substantially perpendicular to said rotational axis.

13. The device of claim 12, wherein said magnetic axis is substantially perpendicular to said first axis.

14. The device of claim 11, wherein a magnetic field of said permanent magnet and a magnetic field of said electromagnet interact when said electromagnet is selectively activated.

15. The device of claim 3, wherein alternating a polarity of said magnetic field causes said permanent magnet to oscillate between first and second positions, wherein said mirror tilts between first and second angular positions about said first axis.

16. The device of claim 15, wherein said mirror is operable to oscillate between said first and second angular positions in conjunction with selective movement of said frame relative to said rotational axis.

17. The device of claim 1, wherein said mirror has a width between about 10 mm and 150 mm.

18. The device of claim 17, wherein said device is operative to deflect a light beam having a diameter up to about 120 mm.

19. A light beam deflector, comprising:
   a reflective device having a reflective surface, wherein said reflective surface defines a reference plane;
   a support structure for supporting the reflective device; and
   a drive mechanism for controllably driving the reflective device for angular motion about a first axis disposed substantially in the reference plane and for rotating said support structure about a second axis transverse to the reference plane.

20. The device of claim 19, wherein said drive mechanism is operative to tilt said reflective surface in an operating aperture of between about –60° and about +60° relative to said first axis.

21. The device of claim 20, wherein said drive mechanism is operative to hold said reflective surface at a fixed angle relative to said first axis.

22. The device of claim 20, wherein said drive mechanism is operative to controllably move said reflective surface between any two tilt positions in said operating aperture.

23. The device of claim 20, wherein said drive mechanism is operative to controllably oscillate said reflective surface between any two tilt positions in said operating aperture.

24. The device of claim 19, wherein said first axis and said second axis intersect on said reflective surface of said mirror.

25. The device of claim 24, wherein said first axis and said second axis are substantially perpendicular.

26. The device of claim 19, wherein said drive mechanism is operative to controllably rotate said support structure about said second axis.

27. The device of claim 26, wherein said drive mechanism is operative to controllably oscillate said support structure between any two angular positions about said second axis.

28. The device of claim 19, wherein said drive mechanism is operative to controllably drive the angular motion of the reflective device about said first and second axes to deflect a light beam to a desired point in space with said reflective surface.

29. A light beam deflector, comprising:
   a frame mounted for selective movement about a rotational axis;
   a mirror mounted to said frame, said mirror being operable to tilt relative to said frame about a first axis, wherein said first axis and said rotational axis are transverse;
   a tilt drive mechanism for controllably tilting said mirror relative to said first axis, comprising:

a permanent magnet interconnected to said mirror; and an electromagnet interconnected to said frame and disposed proximate to said permanent magnet for selectively generating a magnetic field to selectively attract and repel said permanent magnet, wherein said electromagnet includes a ferromagnetic core having first and second ends aligned with said rotational axis.

30. The device of claim 29, wherein first and second ends of said core form first and second magnetic poles when said electromagnet generates said magnetic field.

31. The device of claim 29, wherein said electromagnet further comprises:

a coil for receiving controllable voltages for controlling a magnitude and polarity of said magnetic field.

32. The device of claim 29, wherein said permanent magnet has a magnetic axis aligned substantially perpendicular to said rotational axis.

33. The device of claim 32, wherein said magnetic axis is substantially perpendicular to said first axis.

34. The device of claim 29, wherein said mirror is operable to oscillate between said first and second angular positions in conjunction with selective movement of said frame relative to said rotational axis.

35. The device of claim 29, wherein said first axis is substantially aligned with a surface of said mirror.

36. The device of claim 35, wherein said first axis and said rotational axis are perpendicular and intersect.

* * * * *

UNITED STATES PATENT AND TRADEMARK OFFICE
CERTIFICATE OF CORRECTION

PATENT NO. : 7,019,877 B2 Page 1 of 1
DATED : March 28, 2006
INVENTOR(S) : Shpizel It is certified that error appears in the above-identified patent and that said Letters Patent is hereby corrected as shown below:

<u>Column 9,</u>
Line 31, delete "compnses" and insert -- comprises --.

Signed and Sealed this

Twenty-third Day of May, 2006

JON W. DUDAS
*Director of the United States Patent and Trademark Office*